US012784747B2

(12) United States Patent
Kim

(10) Patent No.: US 12,784,747 B2
(45) Date of Patent: Nov. 3, 2026

(54) VOICE PROCESSING DEVICE FOR PROCESSING VOICES OF SPEAKERS

(71) Applicant: AMOSENSE CO., LTD., Cheonan-si (KR)

(72) Inventor: Jungmin Kim, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 351 days.

(21) Appl. No.: 18/022,498

(22) PCT Filed: Aug. 23, 2021

(86) PCT No.: PCT/KR2021/011205
§ 371 (c)(1),
(2) Date: Feb. 21, 2023

(87) PCT Pub. No.: WO2022/039578
PCT Pub. Date: Feb. 24, 2022

(65) Prior Publication Data

US 2023/0260509 A1 Aug. 17, 2023

(30) Foreign Application Priority Data

Aug. 21, 2020 (KR) ........................ 10-2020-0105331
Jun. 1, 2021 (KR) ........................ 10-2021-0070489

(51) Int. Cl.
*G10L 15/22* (2006.01)
*B60W 50/08* (2020.01)
*G10L 17/04* (2013.01)

(52) U.S. Cl.
CPC ............. *G10L 15/22* (2013.01); *B60W 50/08* (2013.01); *G10L 17/04* (2013.01); *G10L 2015/223* (2013.01)

(58) Field of Classification Search
CPC ............... G10L 15/22; G10L 2015/223; G10L 21/0272; B60W 50/08; H04M 2201/41; H04M 3/568; H04W 4/02
See application file for complete search history.

(56) References Cited

U.S. PATENT DOCUMENTS 9,947,339 B2 4/2018 Son et al.
2004/0066941 A1* 4/2004 Amada ................ G01S 3/8083 381/98

(Continued)

FOREIGN PATENT DOCUMENTS

KR 10-2006-0119655 A 11/2006
KR 10-2013-0063542 A 6/2013

(Continued)

OTHER PUBLICATIONS

KR Office Action dated Feb. 12, 2025 as received in Application No. 10-2021-0070489.

(Continued)

*Primary Examiner* — Michael N Opsasnick
(74) *Attorney, Agent, or Firm* — Maschoff Brennan

(57) ABSTRACT

A voice processing device can separate and process spoken voice signals by correlating them with speaker terminal locations. The device can include a voice data receiver for capturing audio and a wireless receiver for obtaining a terminal identifier from a speaker-worn device. The processor can generate terminal location data based on the wireless signal, match each speaker's voice to the corresponding terminal ID, and store this information in memory. By matching spatially separated voice data with specific terminal IDs, the system can enable accurate voice-source association and can support selective processing based on the speaker's identity and location.

7 Claims, 10 Drawing Sheets

(56) References Cited

U.S. PATENT DOCUMENTS

| | | | | |
|---|---|---|---|---|
| 2007/0014252 | A1 | 1/2007 | Chung et al. | |
| 2007/0140187 | A1* | 6/2007 | Rokusek | H04L 67/51 370/338 |
| 2009/0055170 | A1* | 2/2009 | Nagahama | G10L 21/0272 704/226 |
| 2013/0260782 | A1 | 10/2013 | Un et al. | |
| 2016/0255460 | A1* | 9/2016 | Bottino | H04M 3/42042 455/41.2 |
| 2018/0050696 | A1* | 2/2018 | Misu | A61B 5/6893 |
| 2018/0226077 | A1 | 8/2018 | Choi et al. | |
| 2019/0164567 | A1 | 5/2019 | Liu | |
| 2022/0319531 | A1* | 10/2022 | Kotulla | G10L 21/0272 |
| 2023/0260509 | A1* | 8/2023 | Kim | G10L 21/0272 704/275 |

FOREIGN PATENT DOCUMENTS

| | | | |
|---|---|---|---|
| KR | 10-2014-0011881 | A | 1/2014 |
| KR | 10-2014-0138782 | A | 12/2014 |
| KR | 10-2015-0054941 | A | 5/2015 |
| KR | 10-2016-0026457 | A | 3/2016 |
| KR | 10-2017-0111450 | A | 10/2017 |
| KR | 10-2017-0136718 | A | 12/2017 |
| WO | 2013/074843 | A1 | 6/2012 |
| WO | 2014/043207 | A1 | 3/2014 |

OTHER PUBLICATIONS

KR Office Action in application No. 10-2020-0105331 dated Sep. 14, 2025.

KR Notice of Allowance in application No. 10-2021-0070489 dated Oct. 28, 2025.

* cited by examiner

[FIG. 1]
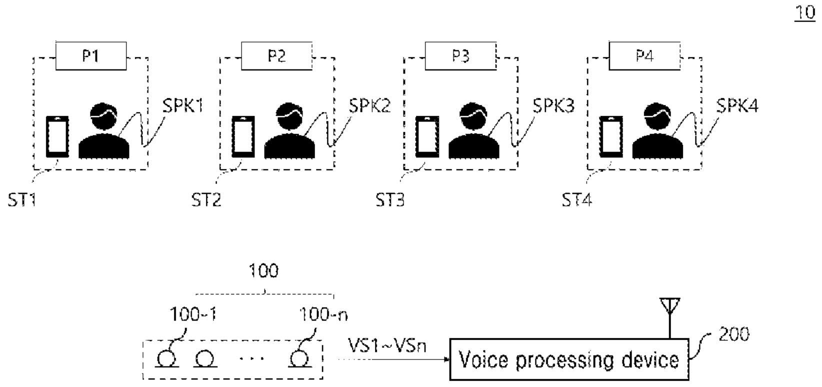
[FIG. 2]
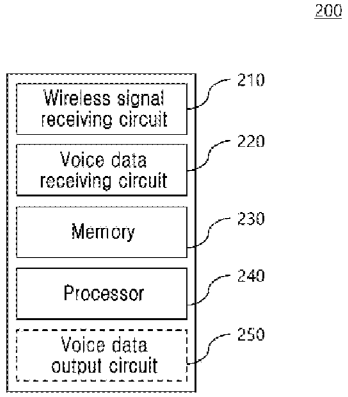

[FIG. 3]
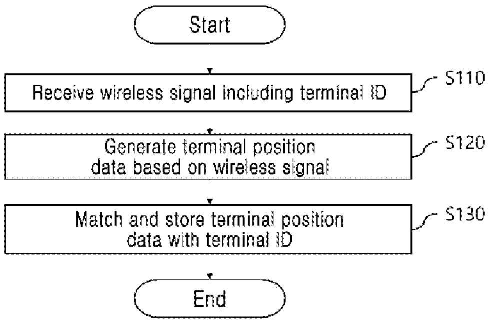
[FIG. 4]
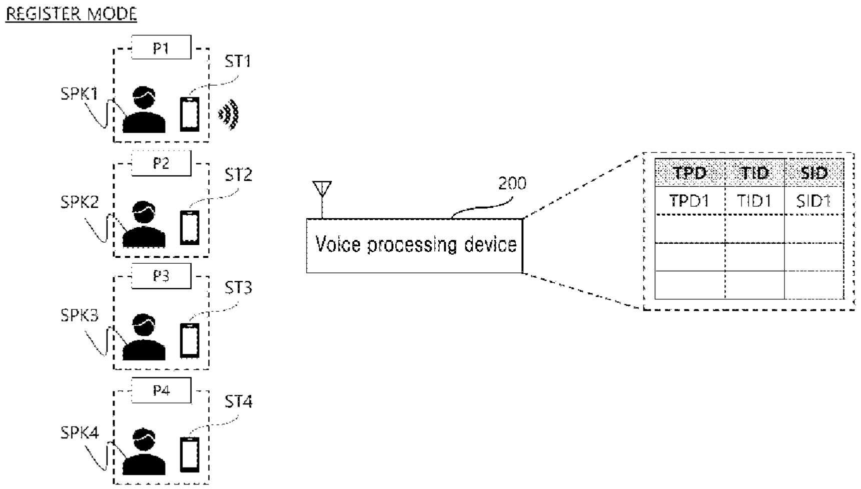

[FIG. 5]
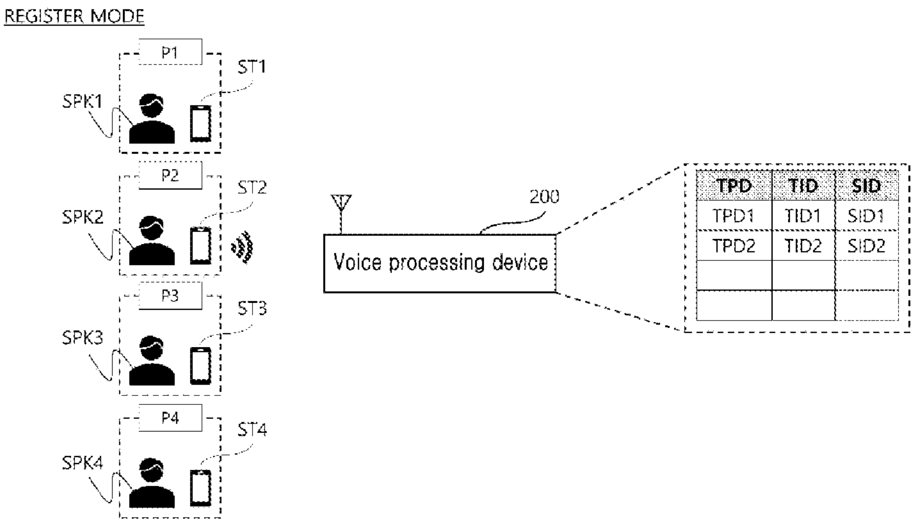
[FIG. 6]
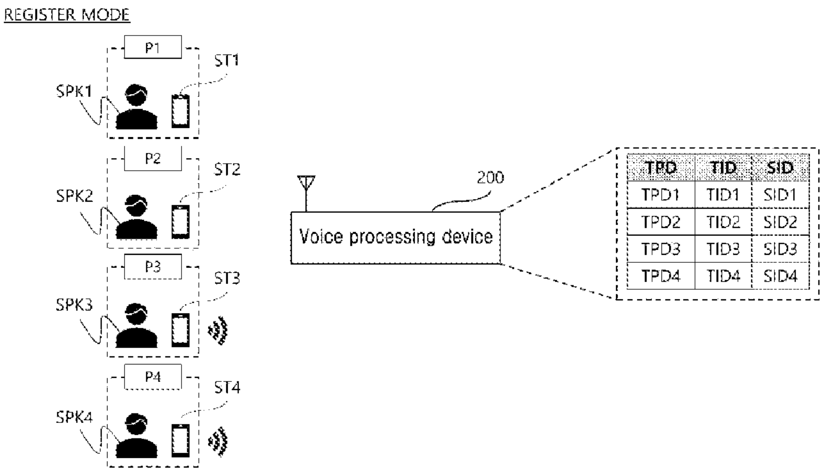

[FIG. 7]
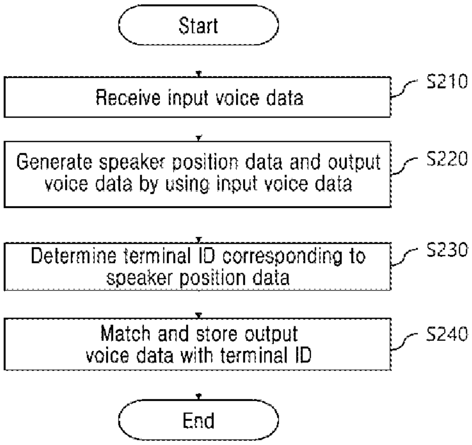
[FIG. 8]
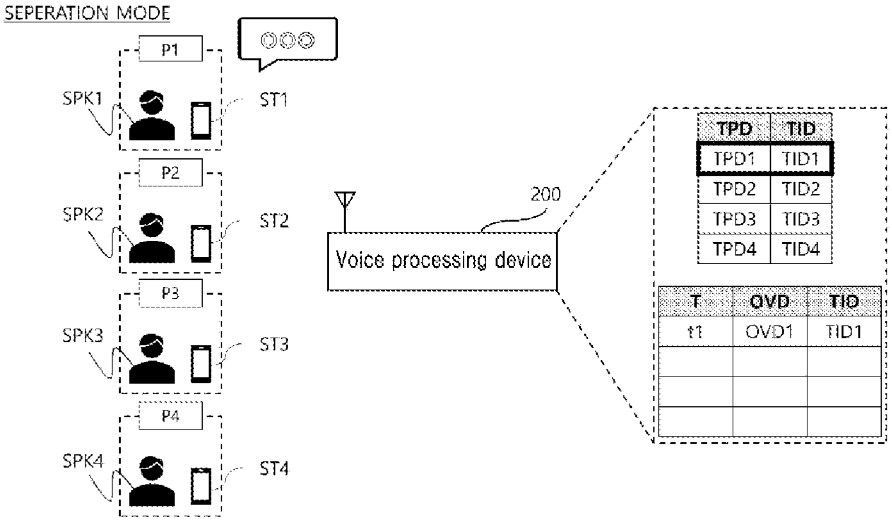

[FIG. 9]
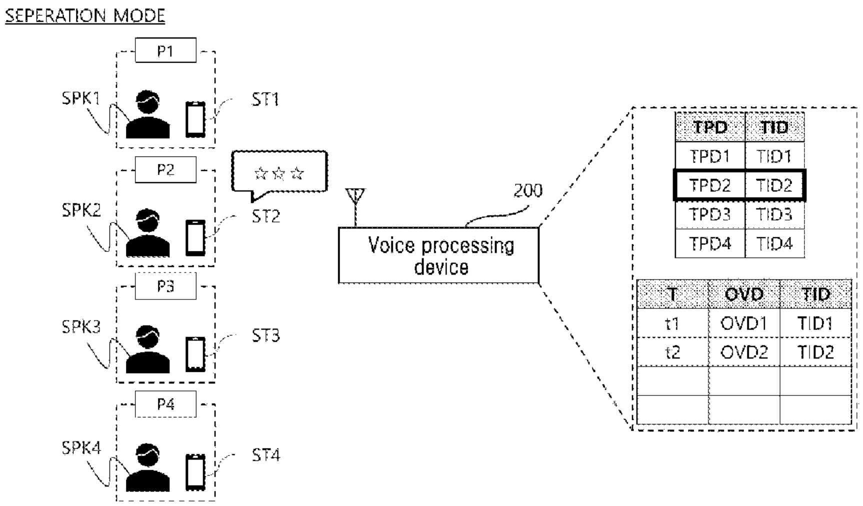
[FIG. 10]
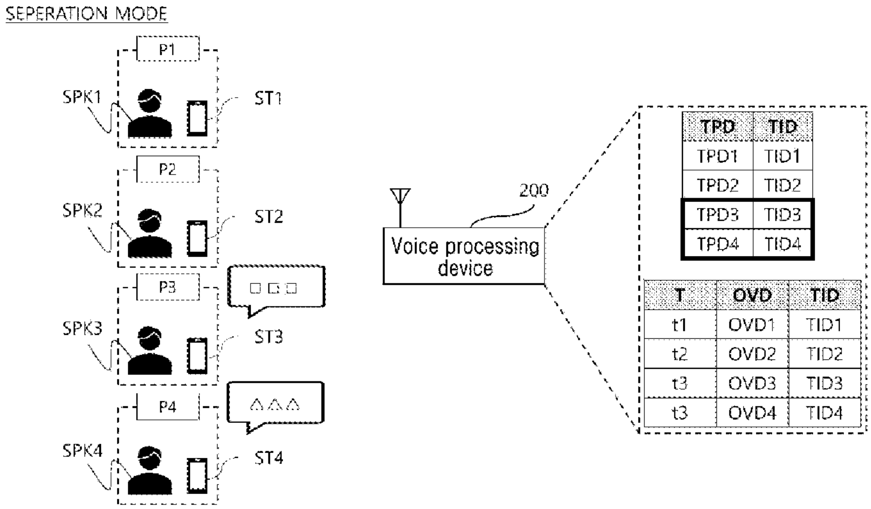

[FIG. 11]
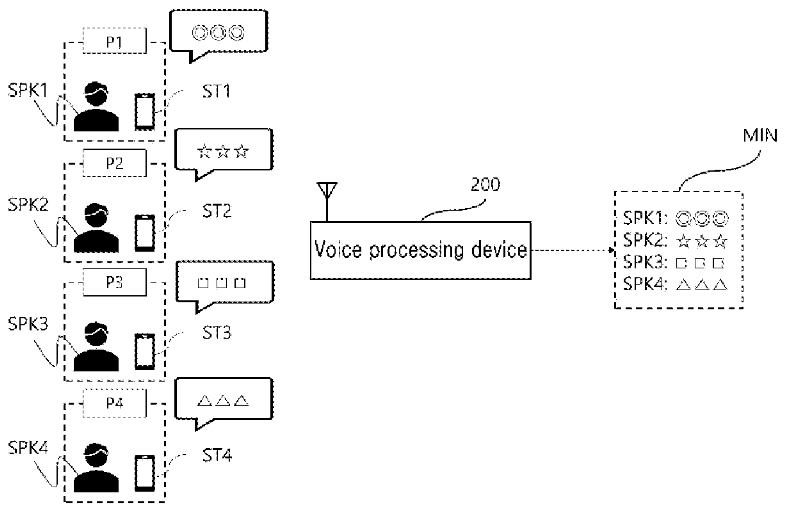
[FIG. 12]
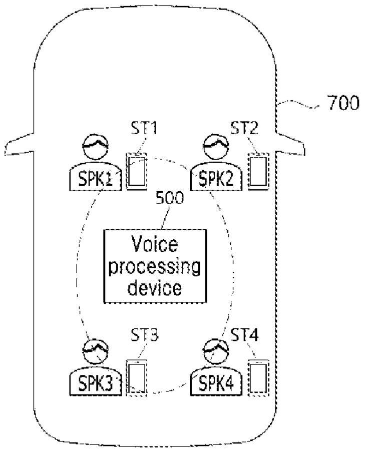

[FIG. 13]
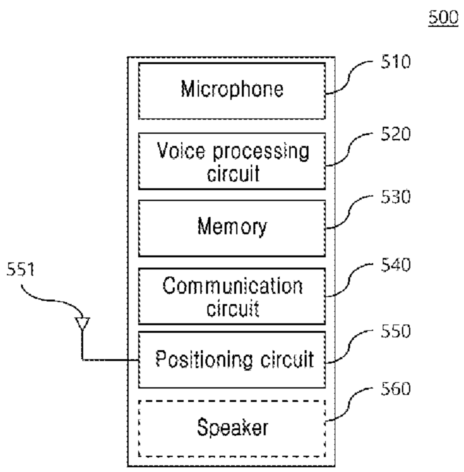
[FIG. 14]
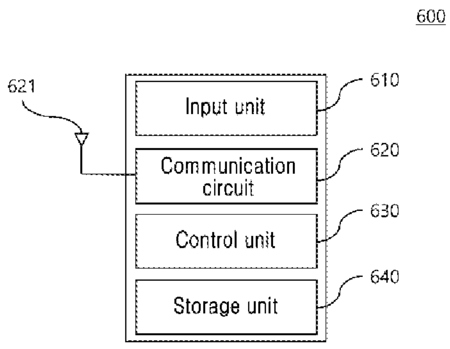

[FIG. 15]
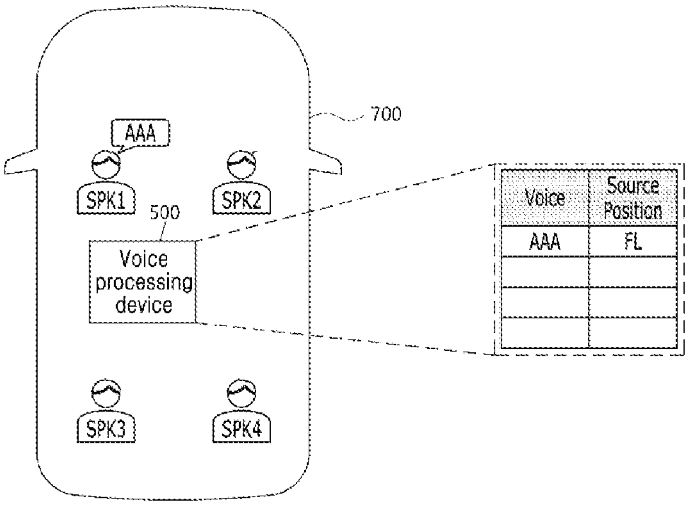
[FIG. 16]
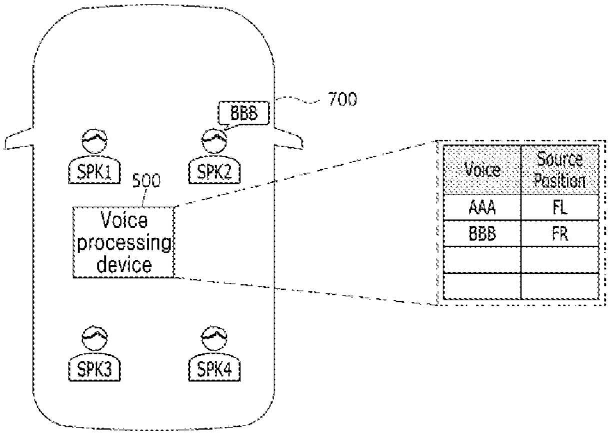

[FIG. 17]
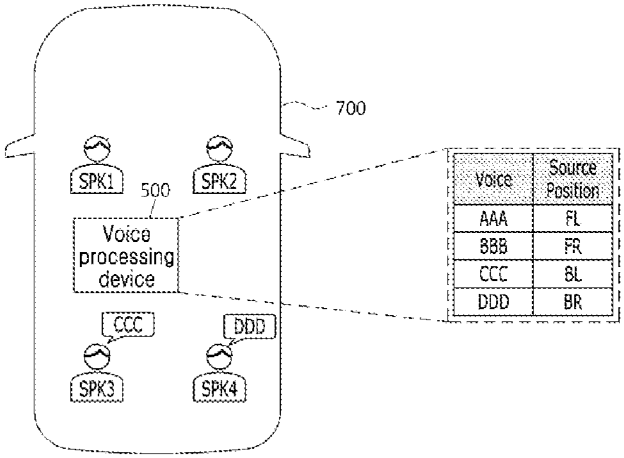
[FIG. 18]
| Terminal ID | Authority level |
|---|---|
| ID1 (ST1) | 4 |
| ID2 (ST2) | 2 |
| ID3 (ST3) | 2 |
| ID4 (ST4) | 1 |

[FIG. 19]
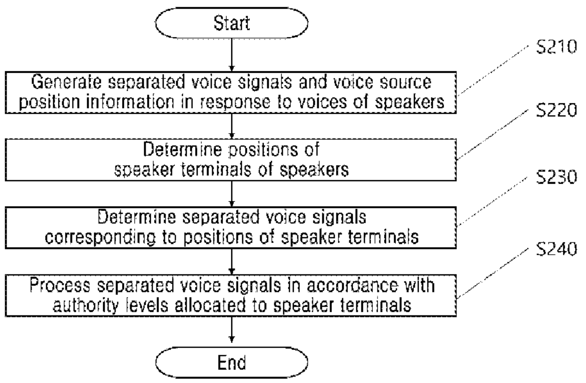
[FIG. 20]
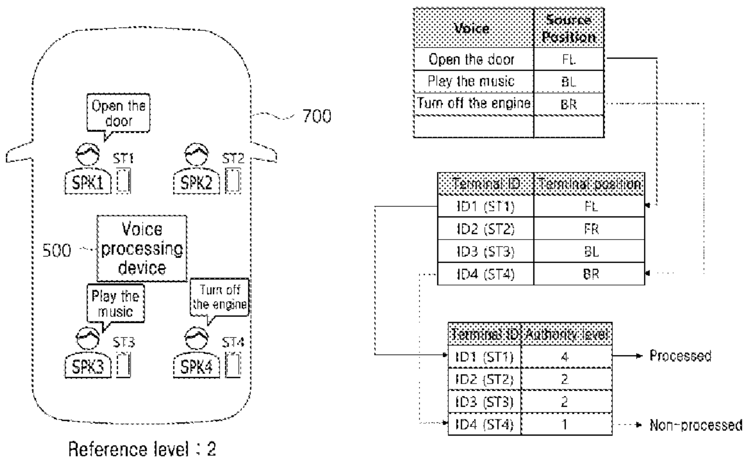

VOICE PROCESSING DEVICE FOR PROCESSING VOICES OF SPEAKERS

TECHNICAL FIELD

Embodiments of the present disclosure relate to a voice processing device for processing voices of speakers.

BACKGROUND ART

A microphone is a device which recognizes voice, and converts the recognized voice into a voice signal that is an electrical signal. In case that a microphone is disposed in a space in which a plurality of speakers are located, such as a meeting room or a classroom, the microphone receives all voices from the plurality of speakers, and generates voice signals related to the voices from the plurality of speakers. Accordingly, in case that the plurality of speakers pronounce at the same time, it is required to separate the voice signals of the plurality of speakers. Further, it is required to grasp which speaker each of the separated voice signals is caused by.

SUMMARY OF INVENTION

Technical Problem

An object of the present disclosure is to provide a voice processing device, which can judge positions of speakers by using input voice data and separate the input voice data by speakers.

Another object of the present disclosure is to provide a voice processing device, which can easily identify speakers of voices related to voice data by determining positions of speaker terminals, judging positions of speakers of input voice data, and identifying the speaker terminals existing at positions corresponding to the positions of the speakers.

Still another object of the present disclosure is to provide a voice processing device, which can process separated voice signals in accordance with authority levels corresponding to speaker terminals carried by speakers.

Solution to Problem

A voice processing device according to embodiments of the present disclosure includes: a voice data receiving circuit configured to receive input voice data related to a voice of a speaker; a wireless signal receiving circuit configured to receive a wireless signal including a terminal ID from a speaker terminal of the speaker; a memory; and a processor configured to generate terminal position data representing a position of the speaker terminal based on the wireless signal and match and store, in the memory, the generated terminal position data with the terminal ID, wherein the processor is configured to: generate first speaker position data representing a first position and first output voice data related to a first voice pronounced at the first position by using the input voice data, read first terminal ID corresponding to the first speaker position data with reference to the memory, and match and store the first terminal ID with the first output voice data.

A voice processing device according to embodiments of the present disclosure includes: a microphone configured to generate voice signals in response to voices pronounced by a plurality of speakers; a voice processing circuit configured to generate separated voice signals related to the voices by performing voice source separation of the voice signals based on voice source positions of the voices; a positioning circuit configured to measure terminal positions of speaker terminals of the speakers, and a memory configured to store authority level information representing authority levels of the speaker terminals, wherein the voice processing circuit is configured to: determine the speaker terminal having the terminal position corresponding to the voice source position of the separated voice signal, and process the separated voice signal in accordance with the authority level corresponding to the determined speaker terminal with reference to the authority level information.

Advantageous Effects of Invention

The voice processing device according to embodiments of the present disclosure can judge the positions of the speakers by using the input voice data, and separate the input voice data by speakers.

The voice processing device according to embodiments of the present disclosure can easily identify the speakers of the voices related to the voice data by determining the positions of the speaker terminals, judging the positions of the speakers of the input voice data, and identifying the speaker terminals existing at the positions corresponding to the positions of the speakers.

The voice processing device according to embodiments of the present disclosure can process the separated voice signals in accordance with the authority levels corresponding to the speaker terminals carried by the speakers.

BRIEF DESCRIPTION OF DRAWINGS

FIG. 1 illustrates a voice processing system according to embodiments of the present disclosure.

FIG. 2 illustrates a voice processing device according to embodiments of the present disclosure.

FIG. 3 is a flowchart illustrating a method for operating a voice processing device according to embodiments of the present disclosure.

FIGS. 4 to 6 are diagrams explaining an operation of a voice processing device according to embodiments of the present disclosure.

FIG. 7 is a flowchart illustrating an operation of a voice processing device according to embodiments of the present disclosure.

FIGS. 8 to 10 are diagrams explaining an operation of a voice processing device according to embodiments of the present disclosure.

FIG. 11 is a diagram explaining an operation of a voice processing device according to embodiments of the present disclosure.

FIG. 12 illustrates a voice processing device according to embodiments of the present disclosure.

FIG. 13 illustrates a voice processing device according to embodiments of the present disclosure.

FIG. 14 illustrates a speaker terminal according to embodiments of the present disclosure.

FIGS. 15 to 17 are diagrams explaining an operation of a voice processing device according to embodiments of the present disclosure.

FIG. 18 illustrates an authority level of a speaker terminal according to embodiments of the present disclosure.

FIG. 19 is a flowchart illustrating a method for operating a voice processing device according to embodiments of the present disclosure.

FIG. 20 is a diagram explaining an operation of a voice processing device according to embodiments of the present disclosure.

DESCRIPTION OF EMBODIMENTS

Hereinafter, embodiments of the present disclosure will be described with reference to the accompanying drawings.

FIG. 1 illustrates a voice processing system according to embodiments of the present disclosure. Referring to FIG. 1, a voice processing system 10 according to embodiments of the present disclosure may receive voices of speakers SPK1 to SPK4, and separate voice data corresponding to the voices of the speakers SPK1 to SPK4 by speakers. According to embodiments, the voice processing system 10 may determine the positions of the speakers SPK1 to SPK4 based on the voices of the speakers SPK1 to SPK4, and separate the voice data by speakers SPK1 to SPK4 based on the determined positions.

The voice processing system 10 may include speaker terminals ST1 to ST4 of the speakers SPK1 to SPK4, a plurality of microphones 100-1 to **100-*n* (n is a natural number; collectively 100) configured to receive the voices of the speakers SPK1 to SPK4, and a voice processing device 200**.

The speakers SPK1 to SPK4 may be positioned at positions P1 to P4, respectively. According to embodiments, the speakers SPK1 to SPK4 positioned at the positions P1 to P4 may pronounce the voices. For example, the first speaker SPK1 positioned at the first position P1 may pronounce the first voice, and the second speaker SPK2 positioned at the second position P2 may pronounce the second voice. The third speaker SPK3 positioned at the third position P3 may pronounce the third voice, and the fourth speaker SPK4 positioned at the fourth position P4 may pronounce the fourth voice. Meanwhile, embodiments of the present disclosure are not limited to the number of speakers.

The speaker terminals ST1 to ST4 corresponding to the speakers SPK1 to SPK4 may transmit wireless signals. According to embodiments, the speaker terminals ST1 to ST4 may transmit the wireless signals including terminal IDs for identifying the speaker terminals ST1 to ST4, respectively. For example, the speaker terminals ST1 to ST4 may transmit the wireless signals in accordance with a wireless communication method, such as ZigBee, Wi-Fi, Bluetooth low energy (BLE), or ultra-wideband (UWB).

As described later, the wireless signals transmitted from the speaker terminals ST1 to ST4 may be used to calculate the positions of the speaker terminals ST1 to ST4.

The voices of the speakers SPK1 to SPK4 may be received by the plurality of microphones 100. The plurality of microphones 100 may be disposed in a space in which they can receive the voices of the speakers SPK1 to SPK4.

The plurality of microphones 100 may generate voice signals VS1 to VSn related to the voices. According to embodiments, the plurality of microphones 100 may receive the voices of the speakers SPK1 to SPK4 positioned at the positions P1 to P4, respectively, and convert the voices of the speakers SPK1 to SPK4 into the voice signals VS1 to VSn that are electrical signals. For example, a first microphone 100-1 may receive the voices of the speakers SPK1 to SPK4, and generate the first voice signal VS1 related to the voices of the speakers SPK1 to SPK4. The first voice signal VS1 generated by the first microphone 100-1 may correspond to the voices of one or more speakers SPK1 to SPK4.

Meanwhile, the voice signal described in the description may be an analog type signal or digital type data. According to embodiments, since the analog type signal and the digital type data may be converted into each other, and include substantially the same information even if the signal type (analog or digital) is changed, the digital type voice signal and the analog type voice signal are interchangeably used in describing embodiments of the present disclosure.

The plurality of microphones 100 may output the voice signals VS1 to VSn. According to embodiments, the plurality of microphones 100 may transmit the voice signals VS1 to VSn to the voice processing device 200. For example, the plurality of microphones 100 may transmit the voice signals VS1 to VSn to the voice processing device 200 in accordance with a wired or wireless method.

The plurality of microphones 100 may be composed of beamforming microphones, and receive the voices multi-directionally. According to embodiments, the plurality of microphones 100 may be disposed to be spaced apart from one another to constitute one microphone array, but embodiments of the present disclosure are not limited thereto.

Each of the plurality of microphones 100 may be a directional microphone configured to receive the voice in a certain specific direction, or an omnidirectional microphone configured to receive the voices in all directions.

The voice processing device 200 may be a computing device having an arithmetic processing function. According to embodiments, the voice processing device 200 may be implemented by a computer, a notebook computer, a mobile device, a smart phone, or a wearable device, but is not limited thereto. For example, the voice processing device 200 may include at least one integrated circuit having the arithmetic processing function.

The voice processing device 200 may receive wireless signals transmitted from the speaker terminals ST1 to ST4. According to embodiments, the voice processing device 200 may calculate spatial positions of the speaker terminals ST1 to ST4 based on the wireless signals transmitted from the speaker terminals ST1 to ST4, and generate terminal position data representing the positions of the speaker terminals ST1 to ST4.

The voice processing device 200 may match and store the terminal position data with corresponding terminal IDs.

The voice processing device 200 may receive input voice data related to the voices of the speakers SPK1 to SPK4, and separate (or generate) voice data representing individual voices of the speakers SPK1 to SPK4 from the input voice data.

According to embodiments, the voice processing device 200 may receive voice signals VS1 to VSn that are transmitted from the plurality of microphones 100, and obtain the input voice data related to the voices of the speakers SPK1 to SPK4 from the voice signals VS1 to VSn.

Meanwhile, although it is assumed, in the description, that the voice processing device 200 receives the voice signals VS1 to VSn from the plurality of microphones 100 and obtains the input voice data related to the voices of the speakers SPK1 to SPK4, according to embodiments, it is also possible for the voice processing device 200 to receive the input voice data related to the voices of the speakers SPK1 to SPK4 from an external device.

The voice processing device 200 may determine the positions of the speakers SPK1 to SPK4 (i.e., positions of voice sources) by using the input voice data related to the voices of the speakers SPK1 to SPK4. According to embodiments, the voice processing device 200 may generate speaker position data representing the positions of the voice sources (i.e., positions of the speakers) from the input voice data related to the voices of the speakers SPK1 to SPK4 based on at least one of distances among the plurality of microphones 100, differences among times when the plurality of microphones 100 receive the voices of the speakers SPK1 to SPK4, respectively, and levels of the voices of the speakers SPK1 to SPK4.

The voice processing device 200 may separate the input voice data in accordance with the positions of the speakers (i.e., positions of the voice sources) based on the speaker position data representing the positions of the voice sources of the voices (i.e., positions of the speakers SPK1 to SPK4). According to embodiments, the voice processing device 200 may generate output voice data related to the voice pronounced from a specific position from the input voice data based on the speaker position data.

For example, in case that the first speaker SPK1 and the second speaker SPK2 pronounce as overlapping each other in time, the voices of the first speaker SPK1 and the second speaker SPK2 overlap each other, and thus the input voice data may also include the voice data related to the voice of the first speaker SPK1 and the voice data related to the voice of the second speaker SPK2. As described above, the voice processing device 200 may generate the speaker position data representing the respective positions of the first speaker SPK1 and the second speaker SPK2 from the input voice data related to the voice of the first speaker SPK1 and the voice of the second speaker SPK2, and generate first output voice data representing the voice of the first speaker SPK1 and second output voice data representing the voice of the second speaker SPK2 from the input voice data based on the speaker position data. In this case, the first output voice data may be the voice data having the highest correlation with the voice of the first speaker SPK1 among the voices of the speakers SPK1 to SPK4. In other words, the voice component of the first speaker SPK1 may have the highest proportion among voice components included in the first output voice data.

The voice processing device 200 according to embodiments of the present disclosure may generate the speaker position data representing the positions of the speakers SPK1 to SPK4 by using the input voice data, determine the terminal IDs corresponding to the speaker position data, and match and store the determined terminal IDs with the output voice data related to the voices of the speakers SPK1 to SPK4.

That is, the voice processing device 200 may match and store the voice data related to the voices of the speakers SPK1 to SPK4 with the terminal IDs of the speaker terminals ST1 to ST4 of the speakers SPK1 to SPK4, and thus the voice data related to the voices of the speakers SPK1 to SPK4 may be identified through the terminal IDs. In other words, even if the plural speakers SPK1 to SPK4 pronounce the voices at the same time, the voice processing device 200 can separate the voice data by speakers.

According to embodiments, the voice processing system 10 according to embodiments of the present disclosure may further include a server 300, and the voice processing device 200 may transmit the output voice data related to the voices of the speakers SPK1 to SPK4 to the server 300.

According to embodiments, the server 300 may convert the output voice data into text data and transmit the converted text data to the voice processing device 200, and the voice processing device 200 may match and store the converted text data related to the voices of the speakers SPK1 to SPK4 with the terminal IDs. Further, the server 300 may convert text data of a first language into text data of a second language, and transmit the converted text data of the second language to the voice processing device 200.

According to embodiments, the voice processing system 10 according to embodiments of the present disclosure may further include a loudspeaker 400. The voice processing device 200 may transmit the output voice data related to the voices of the speakers SPK1 to SPK4 to the loudspeaker 400. The loudspeaker 400 may output the voices corresponding to the voices of the speakers SPK1 to SPK4.

FIG. 2 illustrates a voice processing device according to embodiments of the present disclosure. Referring to FIG. 2, the voice processing device 200 may include a wireless signal receiving circuit 210, a voice data receiving circuit 220, a memory 230, and a processor 240. According to embodiments, the voice processing device 200 may further selectively include a voice data output circuit 250.

The wireless signal receiving circuit 210 may receive wireless signals transmitted from the speaker terminals ST1 to ST4. According to embodiments, the wireless signal receiving circuit 210 may include an antenna, and receive the wireless signals transmitted from the speaker terminals ST1 to ST4 through the antenna.

The voice data receiving circuit 220 may receive input voice data related to the voices of speakers SPK1 to SPK4. According to embodiments, the voice data receiving circuit 220 may receive the input voice data related to the voices of speakers SPK1 to SPK4 in accordance with a wired or wireless communication method.

According to embodiments, the voice data receiving circuit 220 may include an analog-to-digital converter (ADC), receive analog type voice signals VS1 to VSn from the plurality of microphones 100, convert the voice signals VS1 to VSn into digital type input voice data, and store the converted input voice data.

According to embodiments, the voice data receiving circuit 220 may include a communication circuit that is communicable in accordance with the wireless communication method, and receive the input voice data through the communication circuit.

The memory 230 may store therein data required to operate the voice processing device 200. According to embodiments, the memory 230 may include at least one of a nonvolatile memory and a volatile memory.

The processor 240 may control the overall operation of the voice processing device 200. According to embodiments, the processor 240 may generate a control command for controlling the operations of the wireless signal receiving circuit 210, the voice data receiving circuit 220, the memory 230, and the voice data output circuit 250, and transmit the control command to the wireless signal receiving circuit 210, the voice data receiving circuit 220, the memory 230, and the voice data output circuit 250.

The processor 240 may be implemented by an integrated circuit having an arithmetic processing function. For example, the processor 240 may include a central processing unit (CPU), a micro controller unit (MCU), a digital signal processor (DSP), a graphics processing unit (GPU), an application specific integrated circuit (ASIC), or a field programmable gate array (FPGA), but the embodiments of the present disclosure are not limited thereto.

The processor 240 described in the description may be implemented by one or more elements. For example, the processor 240 may include a plurality of sub-processors.

The processor 240 may measure the positions of the speaker terminals ST1 to ST4 based on the wireless signals of the speaker terminals ST1 to ST4 received by the wireless signal receiving circuit 210.

According to embodiments, the processor 240 may measure the positions of the speaker terminals ST1 to ST4 and generate terminal position data representing the positions of the speaker terminals ST1 to ST4 based on the reception strength of the wireless signals of the speaker terminals ST1 to ST4.

According to embodiments, the processor 240 may calculate a time of flight (TOF) of the wireless signal by using a time stamp included in the speaker terminals ST1 to ST4, measure the positions of the speaker terminals ST1 to ST4 based on the calculated time of flight, and generate the terminal position data representing the positions of the speaker terminals ST1 to ST4. The processor 240 may store the generated terminal position data in the memory 230.

In addition, the processor 240 may generate the terminal position data representing the positions of the speaker terminals ST1 to ST4 based on the wireless signals in accordance with various wireless communication methods, and the embodiments of the present disclosure are not limited to specific methods for generating the terminal position data.

The processor 240 may judge the positions (i.e., voice source positions of the voices) of the speakers SPK1 to SPK4 by using the input voice data related to the voices of the speakers SPK1 to SPK4, and generate speaker position data representing the positions of the speakers SPK1 to SPK4. For example, the processor 240 may store the speaker position data in the memory 230.

The processor 240 may judge the positions (i.e., voice source positions of the voices) of the speakers SPK1 to SPK4 by using the input voice data related to the voices of the speakers SPK1 to SPK4, and generate speaker position data representing the positions of the speakers SPK1 to SPK4. For example, the processor 240 may store the speaker position data in the memory 230.

The processor 240 may generate the speaker position data representing the positions of the speakers SPK1 to SPK4 from the input voice data related to the voices of the speakers SPK1 to SPK4 based on at least one of distances among the plurality of microphones 100, differences among times when the plurality of microphones 100 receive the voices of the speakers SPK1 to SPK4, respectively, and levels of the voices of the speakers SPK1 to SPK4.

The processor 240 may separate the input voice data in accordance with the positions of the speakers (i.e., positions of the voice sources) based on the speaker position data representing the positions of the speakers SPK1 to SPK4. For example, the voice processing device 200 may generate the output voice data related to the voices of the speakers SPK1 to SPK4 from the input voice data based on the input voice data and the speaker position data, and match and store output voice data with the corresponding speaker position data.

According to embodiments, the processor 240 may generate the speaker position data representing the positions of the first speaker SPK1 and the second speaker SPK2 from the overlapping input voice data related to the voice of the first speaker SPK1 and the voice of the second speaker SPK2, and generate the first output voice data related to the voice of the first speaker APK1 and the second output voice data related to the voice of the second speaker SPK2 from the overlapping input voice data based on the speaker position data. For example, the processor 240 may match and store the first output voice data with the first speaker position data, and match and store the second output voice data with the second speaker position data.

The processor 240 may determine the terminal IDs corresponding to the voice data. According to embodiments, the processor 240 may determine the terminal position data representing the position that is the same as or adjacent to the position represented by the speaker position data corresponding to the voice data, and determine the terminal IDs corresponding to the terminal position data. Since the speaker position data and the terminal position data represent the same or adjacent position, the terminal ID corresponding to the speaker position data becomes the terminal ID of the speaker terminal of the speaker who pronounces the corresponding voice. Accordingly, it is possible to identify the speaker corresponding to the voice data through the terminal ID.

The voice data output circuit 250 may output the output voice data related to the voices of the speakers SPK1 to SPK4. According to embodiments, the voice data output circuit 250 may output the output voice data related to the voices of the speakers SPK1 to SPK4 in accordance with the wired communication method or the wireless communication method.

The voice data output circuit 250 may output the output voice data related to the voices of the speakers SPK1 to SPK4 to the server 300 or the loudspeaker 400.

According to embodiments, the voice data output circuit 250 may include a digital-to-analog converter (DAC), convert the digital type output voice data into analog type voice signals, and output the converted voice signals to the loudspeaker 400.

According to embodiments, the voice signal output circuit 250 may include a communication circuit, and transmit the output voice data to the server 300 or the loudspeaker 400.

The input voice data related to the voices of the speakers SPK1 to SPK4 received by the voice data receiving circuit 220 and the output voice data related to the voices of the speakers SPK1 to SPK4 output by the voice data output circuit 250 may be different from each other from the viewpoint of data, but may represent the same voice.

FIG. 3 is a flowchart illustrating a method for operating a voice processing device according to embodiments of the present disclosure. The operation method being described with reference to FIG. 3 may be implemented in the form of a program that is stored in a computer-readable storage medium.

Referring to FIG. 3, the voice processing device 200 may receive the wireless signals including the terminal IDs of the speaker terminals ST1 to ST4 from the speaker terminals ST1 to ST4 (S110). According to embodiments, the voice processing device 200 may receive the wireless signals including the terminal IDs of the speaker terminals ST1 to ST4 and speaker identifiers from the speaker terminals ST1 to ST4 (S110).

The voice processing device 200 may generate the terminal position data representing the positions of the speaker terminals ST1 to ST4 based on the received wireless signals (S120).

According to embodiments, the voice processing device 200 may generate the terminal position data representing the positions of the speaker terminals ST1 to ST4 based on the reception strength of the wireless signals.

Further, according to embodiments, the voice processing device 200 may generate the terminal position data representing the positions of the speaker terminals ST1 to ST4 based on the time stamp included in the wireless signals. For example, the voice processing device 200 may communicate with the speaker terminals ST1 to ST4 in accordance with the UWB method, and generate the terminal position data representing the positions of the speaker terminals ST1 to ST4 by using the UWB positioning technology.

The voice processing device 200 may match and store, in the memory 230, the generated terminal position data TPD with the terminal ID TID (S130). For example, the voice processing device 200 may match and store the first terminal position data representing the position of the first speaker terminal ST1 with the first terminal ID of the first speaker terminal ST1.

FIGS. 4 to 6 are diagrams explaining an operation of a voice processing device according to embodiments of the present disclosure. Referring to FIGS. 4 to 6, the voice processing device 200 may register and store in advance the positions of the speaker terminals ST1 to ST4 by storing the terminal IDs of the speaker terminals ST1 to ST4 and the terminal position data representing the positions of the speaker terminals ST1 to ST4 by using the wireless signals from the speaker terminals ST1 to ST4.

The first speaker SPK1 is positioned at the first position P1, the second speaker SPK2 is positioned at the second position P2, the third speaker SPK3 is positioned at the third position P3, and the fourth speaker SPK4 is positioned at the fourth position P4. The voice processing device 200 may receive the wireless signals transmitted from the speaker terminals ST1 to ST4. The wireless signals may include the terminal IDs TIDs. According to embodiments, the wireless signals may further include speaker identifiers SIDs for identifying the corresponding speakers SPK1 to SPK4. For example, the speaker identifiers SIDs may be data generated by the speaker terminals ST1 to ST4 in accordance with inputs by the speakers SPK1 to SPK4.

The voice processing device 200 may generate the terminal position data TPD representing the positions of the speaker terminals ST1 to ST4 by using the wireless signals, and match and store the terminal position data TPD with the corresponding terminal IDs TIDs.

As illustrated in FIG. 4, if the wireless signal is output from the first speaker terminal ST1 of the first speaker SPK1, the voice processing device 200 may receive the wireless signal of the first speaker terminal ST1, generate first terminal position data TPD1 representing the position of the first speaker terminal ST1 based on the received wireless signal, and match and store the first terminal position data TPD1 with the first terminal ID TID1. According to embodiments, the wireless signal from the first speaker terminal ST1 may further include the first speaker identifier SID1 representing the first speaker SPK1, and the voice processing device 200 may match and store the first terminal position data TPD1 with the first terminal ID TID1 and the first speaker identifier SID1.

As illustrated in FIG. 5, if the wireless signal is output from the second speaker terminal ST2 of the second speaker SPK2, the voice processing device 200 may receive the wireless signal of the second speaker terminal ST2, generate second terminal position data TPD2 representing the position of the second speaker terminal ST2 based on the received wireless signal, and match and store the second terminal position data TPD2 with the second terminal ID TID2. According to embodiments, the wireless signal from the second speaker terminal ST2 may further include the second speaker identifier SID2 representing the second speaker SPK2, and the voice processing device 200 may match and store the second terminal position data TPD2 with the second terminal ID TID2 and the second speaker identifier SID2.

As illustrated in FIG. 6, if the wireless signal is output from the third speaker terminal ST3 of the third speaker SPK3 and the fourth speaker terminal ST4 of the fourth speaker SPK4, the voice processing device 200 may receive the wireless signals of the third speaker terminal ST3 and the fourth speaker terminal ST4, and generate the third terminal position data TPD3 representing the position of the third speaker terminal ST3 and the fourth terminal position data TPD4 representing the position of the fourth speaker terminal ST4 based on the received wireless signals.

The voice processing device 200 may match and store the third terminal position data TPD3 with the third terminal ID TID3, and match and store the fourth terminal position data TPD4 with the fourth terminal ID TID4.

FIG. 7 is a flowchart illustrating an operation of a voice processing device according to embodiments of the present disclosure. The operation method that is described with reference to FIG. 7 may be implemented in the form of a program stored in a computer-readable storage medium.

Referring to FIG. 7, the voice processing device 200 may receive the input voice data related to the voices of the speakers SPK1 to SPK4 (S210). The voice processing device 200 may store the received input voice data.

For example, the voice processing device 200 may receive the analog type voice signals from the plurality of microphones 100, and obtain the input voice data from the voice signals. For example, the voice processing device 200 may receive the input voice data in accordance with the wireless communication method.

The voice processing device 200 may generate the speaker position data representing the positions of the speakers SPK1 to SPK4 and the output voice data related to the voices of the speakers by using the input voice data (S220).

The voice processing device 200 may calculate the positions of the voice sources of the voices related to the input voice data by using the input voice data. In this case, the positions of the voice sources of the voice data become the positions of the speakers SPK1 to SPK4. The voice processing device 200 may generate the speaker position data representing the calculated positions of the voice sources.

The voice processing device 200 may generate the output voice data related to the voices of the speakers SPK1 to SPK4 by using the input voice data.

According to embodiments, the voice processing device 200 may generate the output voice data corresponding to the speaker position data from the input voice data based on the speaker position data. For example, the voice processing device 200 may generate the first output voice data corresponding to the first position from the input voice data based on the speaker position data. That is, the first output voice data may be voice data related to the voice of the speaker positioned at the first position. In other words, the voice processing device 200 may separate the input voice data by positions, and generate the output voice data corresponding to the respective positions.

For example, the voice processing device 200 may match and store the speaker position data with the output voice data corresponding to the speaker position data.

The voice processing device 200 may determine the terminal IDs corresponding to the speaker position data (S230). According to embodiments, the voice processing device 200 may determine the terminal position data corresponding to the speaker position data among the stored terminal position data, and determine the terminal IDs matched and stored with the determined terminal position data. For example, the voice processing device 200 may determine the terminal position data representing the position that is the same as or adjacent to the position represented by the speaker position data among the terminal position data stored in the memory 230 as the terminal position data corresponding to the speaker position data.

For example, since the terminal IDs are data for identifying the speaker terminals ST1 to ST4 and the speaker terminals ST1 to ST4 correspond to the speakers SPK1 to SPK4, respectively, the terminal ID corresponding to the speaker position data may represent the speaker positioned at the position corresponding to the speaker position data. For example, if the first speaker position data represents the first position P1, the terminal ID corresponding to the first speaker position data may be the first terminal ID of the first speaker terminal ST1 of the first speaker SPK1 positioned at the first position P1.

The voice processing device 200 may match and store the terminal ID corresponding to the speaker position data with the output voice data corresponding to the speaker position data (S240). For example, the voice processing device 200 may determine the first terminal ID corresponding to the first speaker position data, and match and store the first terminal ID with the first output voice data corresponding to the first speaker position data.

For example, as described above, the terminal ID corresponding to the speaker position data may represent the speaker terminal of the speaker positioned at the position corresponding to the speaker position data. Further, the output voice data corresponding to the speaker position data is related to the voice at the position corresponding to the speaker position data. Accordingly, the speaker terminal of the speaker of the output voice data corresponding to the speaker position data can be identified through the terminal ID corresponding to the speaker position data. For example, if the first speaker position data represents the first position P1, the first output voice data corresponding to the first speaker position data is the voice data related to the voice of the first speaker SPK1, and the first terminal ID corresponding to the first speaker position data is the terminal ID of the first speaker terminal ST1.

Thus, according to embodiments of the present disclosure, it is possible to generate the speaker position data and the output voice data corresponding to the speaker position data from the input voice data, and to identify the speaker (or speaker terminal) of the output voice data by comparing the speaker position data with the terminal position data.

FIGS. 8 to 10 are diagrams explaining an operation of a voice processing device according to embodiments of the present disclosure. Referring to FIGS. 8 to 10, the voice processing device 200 may store the terminal position data TPD and the terminal ID TID corresponding to the terminal position data TPD. For example, the first terminal position data TPD may represent the first position P1, and the first terminal ID TID1 may be data for identifying the first speaker terminal ST1.

As illustrated in FIG. 8, the first speaker SPK1 pronounces the first voice "◎◎◎". The voice processing device 200 may receive the input voice data related to the first voice "◎◎◎". For example, the plurality of microphones 100 may generate the voice signals VS1 to VSn corresponding to the first voice "◎◎◎", and the voice processing device 200 may receive the voice signals VS1 to VSn corresponding to the voice "◎◎◎" of the first speaker SPK1, and generate the input voice data from the voice signals VS1 to VSn.

The voice processing device 200 may generate the first speaker position data representing the position of the voice source of the voice "◎◎◎", that is, the first position P1 of the first speaker SPK1 by using the input voice data related to the first voice "◎◎◎".

Further, the voice processing device 200 may generate the first output voice data OVD1 related to the voice pronounced at the first position P1 from the input voice data by using the first speaker position data. For example, the first output voice data OVD1 may be related to the voice "◎◎◎".

The voice processing device 200 may determine the first terminal position data TPD1 corresponding to the first speaker position data among the terminal position data TPD stored in the memory 230. For example, a distance between the position represented by the first speaker position data and the position represented by the first terminal position data TPD1 may be less than a reference distance.

The voice processing device 200 may determine the first terminal ID TID1 matched and stored with the first terminal position data TPD1. For example, the voice processing device 200 may read the first terminal ID TID1.

The voice processing device 200 may match and store the first output voice data OVD1 with the first terminal ID TID1. According to embodiments, the voice processing device 200 may match and store the reception time (e.g., t1) of the input voice data related to the voice "◎◎◎" with the first output voice data OVD1 and the first terminal ID TID1.

That is, the voice processing device 200 may match and store the first output voice data OVD1 related to the voice "◎◎◎" pronounced at the first position P1 with the first terminal ID TID1, and since the first terminal ID TID1 represents the first speaker terminal ST1, a user can identify that the voice "◎◎◎" has been pronounced from the first speaker SPK1 by using the first terminal ID TID1.

Referring to FIG. 9, in the same manner as in FIG. 8, the voice processing device 200 may receive the input voice data related to the second voice "☆☆☆" pronounced by the second speaker SPK2, and generate the second speaker position data representing the position of the voice source of the voice "☆☆☆", that is, the second position P2 of the second speaker SPK2 by using the input voice data.

Further, the voice processing device 200 may generate the second output voice data OVD2 related to the voice "☆☆☆" pronounced at the second position P2 from the input voice data by using the second speaker position data.

The voice processing device 200 may determine the second terminal position data TPD2 corresponding to the second speaker position data among the terminal position data TPD stored in the memory 230, determine the second terminal ID TID2 matched and stored with the second terminal position data TPD2, and read the second terminal ID TID2. The voice processing device 200 may match and store the second output voice data OVD2 related to the voice "☆☆☆" with the second terminal ID TID2.

Referring to FIG. 10, the voice processing device 200 may receive the input voice data related to the third voice "□□□" pronounced by the third speaker SPK3 and the fourth voice "ΔΔΔ" pronounced by the fourth speaker SPK4.

The voice processing device 200 may receive (overlapping) input voice data related to the voice in which the voice "□□□" of the third speaker SPK3 and the voice "ΔΔΔ" of the fourth speaker SPK4 overlap each other, and generate the third speaker position data representing the third position P3 of the third speaker SPK3 and the fourth speaker position data representing the fourth position P4 of the fourth speaker SPK4 by using the overlapping input voice data.

Further, the voice processing device 200 may generate the third output voice data OVD3 related to (only) the voice "□□□" pronounced at the third position P3 and the fourth output voice data OVD4 related to (only) the voice "ΔΔΔ" pronounced at the fourth position P4 from the overlapping input voice data by using the third and fourth speaker position data.

That is, the voice processing device 200 may separate and generate the third output voice data OVD3 related to the voice "□□□" and the fourth output voice data OVD4 related to the voice "ΔΔΔ" from the input voice data in which the voice "□□□" and the voice "ΔΔΔ" overlap each other.

The voice processing device 200 may determine the third terminal position data TPD3 corresponding to the third speaker position data among the terminal position data TPD stored in the memory 230, determine the third terminal ID TID3 matched and stored with the third terminal position data TPD3, and read the third terminal ID TID3. The voice processing device 200 may match and store the third output voice data OVD3 related to the voice "□□□" pronounced by the third speaker SPK3 with the third terminal ID TID3.

Further, the voice processing device 200 may determine the fourth terminal position data TPD4 corresponding to the fourth speaker position data among the terminal position data TPD stored in the memory 230, determine the fourth terminal ID TID4 matched and stored with the fourth terminal position data TPD4, and read the fourth terminal ID TID4. The voice processing device 200 may match and store the fourth output voice data OVD4 related to the voice "ΔΔΔ" pronounced by the fourth speaker SPK4 with the fourth terminal ID TID4.

The voice processing device 200 according to embodiments of the present disclosure can not only separate the output voice data related to the voices pronounced by the speakers at the respective positions but also match and store the output voice data related to the voices of the respective speakers with the speaker terminal IDs of the corresponding speakers from the input voice data related to the overlapping voices.

FIG. 11 is a diagram explaining an operation of a voice processing device according to embodiments of the present disclosure. Referring to FIG. 11, the voice processing device 200 may receive the input voice data, generate the speaker position data and the output voice data corresponding to the speaker position data by using the input voice data, and generate the minutes MIN by using the output voice data. The generated minutes MIN may be stored in the form of a document file, an image file, or a voice file, but is not limited thereto.

The voice processing device 200 may determine the terminal ID corresponding to the speaker position data by comparing the terminal position data with the speaker position data, and match and store the output voice data corresponding to the speaker position data with the terminal ID corresponding to the speaker position data.

Further, the voice processing device 200 may separately store speaker identifiers for identifying speakers corresponding to speaker terminal IDs. For example, the voice processing device 200 may match and store the first terminal ID of the first speaker terminal ST1 of the first speaker SPK1 at the first position P1 with the first speaker identifier representing the first speaker SPK1. Accordingly, the voice processing device 200 may identify the speaker of the output voice data by reading the speaker identifier for identifying the speaker through the terminal ID matched with the output voice data.

The voice processing device 200 may generate the minutes MIN by using the output voice data of the speakers SPK1 to SPK4 and the terminal IDs (or speaker identifiers) matched with the output voice data. For example, the voice processing device 200 may generate the minutes MIN by aligning the voices of the speakers in the order of time by using the times when the input voice data are received.

As illustrated in FIG. 11, in sequence, the first speaker SPK1 pronounces the voice "◎◎◎", the second speaker SPK2 pronounces the voice "☆☆☆", the third speaker SPK3 pronounces the voice "□□□", and the fourth speaker SPK4 pronounces the voice "ΔΔΔ". The pronouncing of the first to fourth speakers SPK1 to SPK4 may overlap in time.

The voice processing device 200 may receive the input voice data related to the voices "◎◎◎", "☆☆☆", "□□□", and "ΔΔΔ", and generate the speaker position data for the voices "◎◎◎", "☆☆☆", "□□□", and "ΔΔΔ" and the output voice data related to the respective voices "◎◎◎", "☆☆☆", "□□□", and "ΔΔΔ". Further, the voice processing device 200 may match and store the output voice data related to the respective voices "◎◎◎", "☆☆☆", "□□□", and "ΔΔΔ" with the corresponding terminal IDs.

The voice processing device 200 may generate the minutes MIN by using the output voice data and the terminal IDs matched and stored with each other. For example, the voice processing device 200 may record the speakers corresponding to the output voice data as the speakers corresponding to the terminal IDs.

According to embodiments, the voice processing device 200 may convert the output voice data into the text data, and generate the minutes MIN in which the speakers for the text data are recorded by using the text data and the matched terminal IDs. The text data of the minutes MIN may be aligned and disposed in the order of time.

FIG. 12 illustrates a voice processing device according to embodiments of the present disclosure. Referring to FIG. 12, the voice processing device 500 may perform the function of the voice processing device 120 of FIG. 1. According to embodiments, the voice processing device 500 may be disposed in a vehicle 700, and processes the voices of the speakers SPK1 to SPK4 positioned inside the vehicle 700.

As described above, the voice processing device according to embodiments of the present disclosure may distinguish the voices of the speakers SPK1 to SPK4 through the terminal IDs of the speaker terminals ST1 to ST4 of the speakers SPK1 to SPK4. Further, the voice processing device according to embodiments of the present disclosure may process the voice signals of the speakers SPK1 to SPK4 in accordance with the authority levels corresponding to the speaker terminals.

The voice processing device 500 may send and receive data with the vehicle 700 (or controller (e.g., electronic controller unit (ECU) or the like) of the vehicle 700). According to embodiments, the voice processing device 500 may transmit instructions for controlling the controller of the vehicle 700 to the controller. According to embodiments, the voice processing device 500 may be integrally formed with the controller of the vehicle 700, and control the operation of the vehicle 700. However, in the description, explanation will be made on the assumption that the controller of the vehicle 700 and the voice processing device 500 are separated from each other.

On respective seats in the vehicle 700, the plurality of speakers SPK1 to SPK4 may be positioned. According to embodiments, the first speaker SPK1 may be positioned on the left seat of the front row, the second speaker SPK2 may be positioned on the right seat of the front row, the third speaker SPK3 may be positioned on the left seat of the back row, and the fourth speaker SPK4 may be positioned on the right seat of the back row.

The voice processing device 500 according to embodiments of the present disclosure may receive the voices of the speakers SPK1 to SPK4 inside the vehicle 700, and generate separated voice signals related to the voices of the speakers, respectively. For example, the voice processing device 500 may generate the first separated voice signal related to the voice of the first speaker. In this case, the voice component of the first speaker SPK1 may have the highest proportion among voice components included in the first separated voice signal. That is, the separated voice signals being described in the description correspond to the output voice data described with reference to FIGS. 1 to 11.

The voice processing device 500 may process the separated voice signals. In the description, processing of the separated voice signals by the voice processing device 500 may mean transmitting the separated voice signals to the vehicle 700 (or controller for controlling the vehicle 700) by the voice processing device, recognizing instructions for controlling the vehicle 700 from the separated voice signals and determining an operation command corresponding to the recognized instructions, transmitting the determined operation command to the vehicle 700, or controlling the vehicle 700 in accordance with the operation command corresponding to the separated voice signals by the voice processing device 500.

The voice processing device 500 according to embodiments of the present disclosure may determine the positions of the speaker terminals ST1 to ST4 carried by the speakers SPK1 to SPK4, and process the separated voice signals at the respective voice source positions in accordance with the authority levels permitted to the speaker terminals ST1 to ST4. That is, the voice processing device 500 may process the separated voice signals related to the voices of the speakers SPK1 to SPK4 in accordance with the authority levels of the speaker terminals ST1 to ST4 at the same (or related) positions. For example, the voice processing device 500 may process the separated voice signal of the voice pronounced at the first voice source position in accordance with the authority level allocated to the speaker terminal positioned at the first voice source position.

Meanwhile, in case of controlling the vehicle 700 through the voices, it is necessary to set the authority levels for the voices of the speakers SPK1 to SPK4 for operation stability. For example, a high authority level may be allocated to the voice of the owner of the vehicle 700, whereas a low authority level may be allocated to the voices of children sitting together.

Meanwhile, in this case, it is required to distinguish which speaker each voice recognized by the voice processing device 500 belongs to, and distinguishing of the speaker from the feature of the voice itself requires a complicated process, takes a long time to process, and has low accuracy.

In contrast, the voice processing device 500 according to embodiments of the present disclosure may identify the speaker terminals ST1 to ST4 corresponding to the voice source positions at which the respective voices are pronounced through the positions of the speaker terminals ST1 to ST4 carried by the speakers SPK1 to SPK4, and process the voices in accordance with the authority levels corresponding to the identified speaker terminals.

Thus, according to embodiments of the present disclosure, since the voices of the speakers SPK1 to SPK4 can be easily identified, the voice processing speed can be improved, and since the voices are processed in accordance with the authority levels, stability (or security) for the voice control can be improved.

According to embodiments, the voice processing device 500 may determine the positions of the speaker terminals ST1 to ST4 by using the signals being transmitted from the speaker terminals ST1 to ST4.

The vehicle 700 may be defined as a transportation or conveyance means that runs on the road, seaway, railway, or airway, such as an automobile, train, motorcycle, or aircraft. According to embodiments, the vehicle 700 may be a concept that includes all of an internal combustion engine vehicle having an engine as the power source, a hybrid vehicle having an engine and an electric motor as the power source, and an electric vehicle having an electric motor as the power source.

The vehicle 700 may receive the voice signals from the voice processing device 500, and perform a specific operation in response to the received voice signals. Further, according to embodiments, the vehicle 700 may perform the specific operation in accordance with the operation command transmitted from the voice processing device 500.

FIG. 13 illustrates a voice processing device according to embodiments of the present disclosure. Referring to FIG. 13, the voice processing device 500 may include a microphone 510, a voice processing circuit 520, a memory 530, a communication circuit 540, and a positioning circuit 550. According to embodiments, the voice processing device 500 may further selectively include a loudspeaker 560.

The function and structure of the microphone 510 may correspond to the function and structure of the microphones 100, the function and structure of the voice processing circuit 520 and the positioning circuit 550 may correspond to the function and structure of the processor 240, and the function and structure of the communication circuit 540 may correspond to the function and structure of the wireless signal receiving circuit 210 and the voice receiving circuit 220. That is, unless separately described hereinafter, it should be understood that the respective constitutions of the voice processing device 500 can perform the functions of the respective constitutions of the voice processing device 200, and hereinafter, only the difference between them will be described.

The voice processing circuit 520 may extract (or generate) the separated voice signals related to the voices of the speakers SPK1 to SPK4 by using the voice signals generated by the microphone 510.

The voice processing circuit 520 may determine the voice source positions (i.e., positions of the speakers SPK1 to SPK4) of the voice signals by using the time delay (or phase delay) between the voice signals. For example, the voice processing circuit 520 may generate the voice source position information representing the voice source positions (i.e., positions of the speakers SPK1 to SPK4) of the voice signals.

The voice processing circuit 520 may generate the separated voice signals related to the voices of the speakers SPK1 to SPK4 from the voice signals based on the determined voice source positions. For example, the voice processing circuit 520 may generate the separated voice signals related to the voices pronounced at a specific position (or direction). According to embodiments, the voice processing circuit 520 may match and store the separated voice signals with the voice source position information.

The memory 530 may store data required to operate the voice processing device 500. According to embodiments, the memory 530 may store the separated voice signals and the voice source position information.

The communication circuit 540 may transmit data to the vehicle 700, or receive data from the vehicle 700.

The communication circuit 540 may transmit the separated voice signals to the vehicle 700 under the control of the voice processing circuit 520. According to embodiments, the communication circuit 540 may transmit the voice source position information together with the separated voice signals.

The positioning circuit 550 may measure the positions of the speaker terminals ST1 to ST4, and generate the terminal position information representing the positions. According to embodiments, the positioning circuit 550 may measure the positions of the speaker terminals ST1 to ST4 by using the wireless signals output from the speaker terminals ST1 to ST4.

For example, the positioning circuit 550 may measure the positions of the speaker terminals ST1 to ST4 in accordance with an ultra-wideband (UWB), wireless local area network (WLAN), ZigBee, Bluetooth, or radio frequency identification (RFID) method, but the embodiments of the present disclosure are not limited to the position measurement method itself.

According to embodiments, the positioning circuit 550 may include an antenna 551 for transmitting and receiving the wireless signals.

The loudspeaker 560 may output the voices corresponding to the voice signals. According to embodiments, the loudspeaker 560 may generate vibrations based on the (combination or separation) voice signals, and the voices may be reproduced in accordance with the vibrations of the loudspeaker 560.

FIG. 14 illustrates a speaker terminal according to embodiments of the present disclosure. A speaker terminal 600 illustrated in FIG. 14 represents the speaker terminals ST1 to ST4 illustrated in FIG. 1. Referring to FIG. 14, the speaker terminal 600 may include an input unit 610, a communication unit 620, a control unit 630, and a storage unit 640.

The input unit 610 may detect a user's input (e.g., push, touch, click, or the like), and generate a detection signal. For example, the input unit 610 may be a touch panel or a keyboard, but is not limited thereto.

The communication unit 620 may perform communication with an external device. According to embodiments, the communication unit 620 may receive data from the external device, or transmit data to the external device.

For position measurement of the speaker terminal 600, the communication unit 620 may send and receive the wireless signal with the voice processing device 500. According to embodiments, the communication unit 620 may receive the wireless signal received from the voice processing device 500, and transmit data related to variables (reception time, reception angle, reception strength, and the like) representing the reception characteristic of the wireless signal to the voice processing device 500. Further, according to embodiments, the communication unit 620 may transmit the wireless signal to the voice processing device 500, and transmit the data related to variables (transmission time, transmission angle, transmission strength, and the like) representing the transmission characteristic of the wireless signal to the voice processing device 500.

For example, the communication unit 620 may send and receive the wireless signal with the voice processing device 500 in order to measure the position of the speaker terminal 600 in accordance with a time of flight (ToF), time difference of arrival (TDoA), angle of arrival (AoA), or received signal strength indicator (RSSI) method.

According to embodiments, the communication unit 620 may include an antenna 321 for transmitting and receiving the wireless signal.

The control unit 630 may control the overall operation of the speaker terminal 600. According to embodiments, the control unit 630 may load a program (or application) stored in the storage unit 640, and perform an operation of the corresponding program in accordance with loading.

According to embodiments, the control unit 630 may control the communication unit 620 so as to perform the position measurement between the voice processing device 500 and the speaker terminal 600.

The control unit 630 may include a processor having an arithmetic processing function. For example, the controller 630 may include a central processing unit (CPU), a micro controller unit (MCU), a graphics processing unit (GPU), and an application processor (AP), but is not limited thereto.

The storage unit 640 may store data required to operate the speaker terminal 600. According to embodiments, the storage unit 640 may store setting values and applications required to operate the speaker terminal 600.

FIGS. 15 to 17 are diagrams explaining an operation of a voice processing device according to embodiments of the present disclosure. Referring to FIGS. 15 to 17, speakers SPK1 to SPK4 positioned at positions FL, FR, BL, and BR, respectively, may pronounce voices.

The voice processing device 500 may determine the voice source positions of the voices (i.e., positions of the speakers SPK1 to SPK4) by using the time delay (or phase delay) between the voice signals, and generate the separated voice signals related to the voices of the speakers SPK1 to SPK4 based on the determined voice source positions.

As illustrated in FIG. 15, the first speaker SPK1 pronounces the voice 'AAA'. If the voice 'AAA' is pronounced, the voice processing device 500 may generate the separated voice signal related to the voice 'AAA' of the first speaker SPK1 in response to the voice 'AAA'. As described above, the voice processing device 500 may generate the separated voice signal related to the voice 'AAA' pronounced at the position of the first speaker SPK1 among the received voices based on the voice source positions of the received voices.

According to embodiments, the voice processing device 500 may store, in the memory 530, the first separated voice signal related to the voice 'AAA' of the first speaker SPK1 and the first voice source position information representing 'FL (forward left)' that is the voice source position of the voice 'AAA' (i.e., position of the first speaker SPK1). For example, as illustrated in FIG. 15, the first separated voice signal and the first voice source position information may be matched and stored with each other.

As illustrated in FIG. 16, the second speaker SPK2 pronounces the voice 'BBB'. If the voice 'BBB' is pronounced, the voice processing device 500 may generate the second separated voice signal related to the voice 'BBB' of the second speaker SPK2 based on the voice source positions of the received voices.

According to embodiments, the voice processing device 500 may store, in the memory 530, the second separated voice signal related to the voice 'BBB' of the second speaker SPK2 and the second voice source position information representing 'FR (forward right)' that is the voice source position of the voice 'BBB' (i.e., position of the second speaker SPK2).

As illustrated in FIG. 17, the third speaker SPK3 pronounces the voice 'CCC' and the fourth speaker SPK4 pronounces the voice 'DDD'. The voice processing device 500 may generate the third separated voice signal related to the voice 'CCC' of the third speaker SPK3 and the fourth separated voice signal related to the voice 'DDD' of the fourth speaker SPK4 based on the voice source positions of the received voices.

According to embodiments, the voice processing device 500 may store, in the memory 530, the third separated voice signal related to the voice 'CCC' of the third speaker SPK3 and the third voice source position information representing 'BL (backward left)' that is the voice source position of the voice 'CCC' (i.e., position of the third speaker SPK3), and the fourth separated voice signal related to the voice 'DDD' of the fourth speaker SPK4 and the fourth voice source position information representing 'BR (backward right)' that is the voice source position of the voice 'DDD' (i.e., position of the fourth speaker SPK4).

FIG. 18 illustrates an authority level of a speaker terminal according to embodiments of the present disclosure. Referring to FIG. 18, the voice processing device 500 may store terminal IDs for identifying the speaker terminals ST1 to ST4 and authority level information representing authority levels of the speaker terminals ST1 to ST4. According to embodiments, the voice processing device 500 may match and store the terminal IDs with the authority level information. For example, the voice processing device 500 may store the terminal IDs and the authority level information in the memory 530.

The authority levels of the speaker terminals ST1 to ST4 are to determine whether to process the separated voice signals pronounced at the voice source positions corresponding to the terminal positions of the speaker terminals ST1 to ST4. That is, the voice processing device 500 may determine the speaker terminals corresponding to the separated voice signals, and process the separated voice signals in accordance with the authority levels allocated to the speaker terminals.

In particular, in case of controlling the vehicle 700 through the voice, according to embodiments of the present disclosure, only the voices of the speakers (or speaker terminals) having the authority levels that are equal to or higher than a predetermined level can be processed, and thus the stability for vehicle control can be much more improved.

According to embodiments, in case that the authority level of the speaker terminal corresponding to the separated voice signal is equal to or higher than a reference level, the voice processing device 500 can process the corresponding separated voice signal. For example, if the reference level is '2', the voice processing device 500 may not process the fourth separated voice signal corresponding to the fourth speaker terminal ST4 having the authority level that is less than the reference level of '2'. Meanwhile, information about the unprocessed separated voice signal may be stored in the voice processing device 500.

Further, according to embodiments, as the authority level of the speaker terminal corresponding to the separated voice signal becomes higher, the voice processing device 500 may process the corresponding separated voice signal at higher priority. For example, since the first speaker terminal ST1 has the highest authority level of '4', the voice processing device 500 may process the first separated voice signal corresponding to the first speaker terminal ST1 at highest priority.

Meanwhile, although four kinds of authority levels are shown in FIG. 18, according to embodiments, two kinds of authority levels may be provided. That is, the authority levels may include a first level at which the process is permitted and a second level at which the process is not permitted.

FIG. 19 is a flowchart illustrating an operation of a voice processing device according to embodiments of the present disclosure. Referring to FIG. 19, the voice processing device 500 may generate the separated voice signals and the voice source position information in response to the voices of the speakers SPK1 to SPK4 (S210). According to embodiments, the voice processing device 500 may generate the separated voice signals related to the voices of the speakers SPK1 to SPK4 and the voice source position information representing the voice source positions of the respective voices.

The voice processing device 500 may determine the positions of the speaker terminals ST1 to ST4 of the speakers SPK1 to SPK4 (S220). According to embodiments, the voice processing device 500 may determine the speaker terminals ST1 to ST4 having the positions corresponding to the voice source positions of the separated voice signals.

The voice processing device 500 may determine the speaker terminals ST1 to ST4 corresponding to the separated voice signals (S230). According to embodiments, the voice processing device 500 may determine the speaker terminals ST1 to ST4 having the positions corresponding to the voice source positions of the separated voice signals.

According to embodiments, the voice processing device 500 may match the separated voice signal corresponding to the same area with the speaker terminal based on respective areas FL, FR, BL, and BR in the vehicle 700. For example, the voice processing device 500 may match the first speaker terminal ST1 corresponding to the 'FL (forward left)' of the vehicle 700 with the first separated voice signal.

The voice processing device 500 may process the separated voice signals in accordance with the authority levels allocated to the speaker terminals corresponding to the separated voice signals (S240). According to embodiments, the voice processing device 500 may read the authority level information from the memory 530, and process the separated voice signals in accordance with the authority levels of the speaker terminals corresponding to (or matched with) the separated voice signals.

For example, since the first separated voice signal corresponding to the voice of the first speaker SPK1 has been pronounced on the 'FL (forward left)', it may be processed in accordance with the authority level of the first speaker terminal ST1 corresponding to the 'FL (forward left)'.

FIG. 20 is a diagram explaining an operation of a voice processing device according to embodiments of the present disclosure. Referring to FIG. 20, the first speaker SPK1 pronounces the voice "Open the door" at the voice source position 'FL (forward left)', the third speaker SPK3 pronounces the voice "Play the music" at the voice source position 'BL (backward left)', and the fourth speaker SPK4 pronounces the voice "Turn off the engine" at the voice source position 'BR (backward right)'.

Meanwhile, according to the authority level information stored in the voice processing device 500, the authority level for the first speaker terminal ST1 is '4', the authority level for the second speaker terminal ST2 is '2', the authority level for the third speaker terminal ST3 is '2', and the authority level for the fourth speaker terminal ST4 is '1'. In this case, the voice processing device 500 can process only the separated voice signals corresponding to the speaker terminals having the authority levels that are equal to or higher than the reference level (e.g., '2').

The voice processing device 500 may generate the separated voice signals corresponding to the voices in response to the voices of the speakers "Open the door", "Play the music", and "Turn off the engine". Further, the voice processing device 500 may generate the voice source position information representing the voice source positions 'FL', 'BL', and 'BR' of the voices of the speakers "Open the door", "Play the music", and "Turn off the engine".

If the voices of the speakers are input, the voice processing device 500 may determine the terminal positions of the speaker terminals ST1 to ST4. According to embodiments, the voice processing device 500 may determine the terminal positions of the speaker terminals ST1 to ST4 by sending and receiving the wireless signals with the speaker terminals ST1 to ST4. The voice processing device 500 may store the terminal position information representing the terminal positions of the speaker terminals ST1 to ST4. In this case, the terminal position information may be matched and stored with the terminal IDs of the speaker terminals ST1 to ST4.

The voice processing device 500 may process the separated voice signals related to the voices of the speakers SPK1 to SPK4 in accordance with the authority levels allocated to the speaker terminals ST1 to ST4 corresponding to the separated voice signals. According to embodiments, the voice processing device 500 may process only the separated voice signals corresponding to the speaker terminals ST1 to ST4 to which the authority levels that are equal to or higher than the reference level are allocated, but the embodiments of the present disclosure are not limited thereto.

As illustrated in FIG. 20, the voice processing device 500 may determine whether to process the first separated voice signal related to the voice "Open the door" of the first speaker SPK1 in accordance with the authority level '4' of the first speaker terminal ST1 corresponding to the first separated voice signal. According to embodiments, the voice processing device 500 may identify the first speaker terminal ST1 having the terminal position corresponding to the position 'FL' of the first separated voice signal, read the authority level of the first speaker terminal ST1, and process the first separated voice signal in accordance with the read authority level. For example, since the reference level is '2', the voice processing device 500 may process the first separated voice signal, and thus the vehicle 700 may perform an operation corresponding to the voice "Open the door" (e.g., door opening operation).

Further, as illustrated in FIG. 20, the voice processing device 500 may determine whether to process the fourth separated voice signal related to the voice "Turn off the engine" of the fourth speaker SPK4 in accordance with the authority level '1' of the fourth speaker terminal ST4 corresponding to the fourth separated voice signal. According to embodiments, the voice processing device 500 may identify the fourth speaker terminal ST4 having the terminal position corresponding to the position 'BR' of the fourth separated voice signal, read the authority level of the fourth speaker terminal ST4, and process the fourth separated voice signal in accordance with the read authority level. For example, since the reference level is '2', the voice processing device 500 may not process the fourth separated voice signal. That is, in this case, although the fourth speaker SPK4 has pronounced the voice "Turn off the engine", the vehicle 700 may not perform the operation corresponding to the "Turn off the engine".

As described above, although embodiments have been described by the limited embodiments and drawings, those of ordinary skill in the corresponding technical field can make various corrections and modifications from the above description. For example, proper results can be achieved even if the described technologies are performed in a different order from that of the described method, and/or the described constituent elements, such as the system, structure, device, and circuit, are combined or assembled in a different form from that of the described method, or replaced by or substituted for other constituent elements or equivalents.

Accordingly, other implementations, other embodiments, and equivalents to the claims belong to the scope of the claims to be described later.

INDUSTRIAL APPLICABILITY

Embodiments of the present disclosure relate to a voice processing device for processing voices of speakers.

The invention claimed is:

1. A voice processing device comprising:

a voice data receiving circuit configured to receive input voice data related to a voice of a speaker;

a wireless signal receiving circuit configured to receive a wireless signal including a terminal ID from a plurality of speaker terminals;

a memory; and a processor configured to generate terminal position data representing a position of each of the speaker terminals based on the wireless signal and match and store, in the memory, the generated terminal position data with the terminal ID of each of the speaker terminals, wherein the processor is configured to:

generate first speaker position data representing a first position and first output voice data related to a first voice pronounced at the first position by using the input voice data, generate second speaker position data representing a second position and second output voice data related to a second voice pronounced at the second position by using the input voice data, determine a first terminal ID of a speaker terminal having a terminal position that is closest to the first position by comparing the first speaker position data and the terminal position data, determine a second terminal ID of a speaker terminal having a terminal position that is closest to the second position by comparing the second speaker position data and the terminal position data, match and store the first terminal ID with the first output voice data, match and store the second terminal ID with the second output voice data, wherein the memory is configured to store authority level information representing an authority level of each of the speaker terminals, and wherein the processor is configured to process the first output voice data and the second output voice data in accordance with the authority level corresponding to the first terminal ID and the second terminal ID respectively with reference to the authority level information.

2. The voice processing device of claim 1, wherein the processor is configured to generate the terminal position data representing the position of the speaker terminal based on reception strength of the wireless signal.

3. The voice processing device of claim 1, wherein the processor is configured to calculate a time of flight of the wireless signal by using a time stamp included in the wireless signal, and generate the terminal position data representing the position of the speaker terminal based on the time of flight.

4. The voice processing device of claim 1, wherein the voice processing device is installed in a vehicle, and wherein processing of the first output voice data by the processor comprises recognizing instructions for controlling the vehicle from the first output voice data, and determining an operation command corresponding to the recognized instructions.

5. The voice processing device of claim 1, wherein the processor is configured to:

process the first output voice data if the authority level corresponding to the first terminal ID is equal to or higher than a reference level, and not process the first output voice data if the authority level corresponding to the first terminal ID is lower than the reference level.

6. The voice processing device of claim 1, wherein the input voice data is generated from voice signals generated by a plurality of microphones.

7. The voice processing device of claim 6, wherein the processor is configured to generate the first speaker position data based on a distance between the plurality of microphones and times when the voice signals are received by the plurality of microphones.

* * * * *